(12) United States Patent
Park

(10) Patent No.: US 9,985,496 B2
(45) Date of Patent: May 29, 2018

(54) STEP ACTUATOR

(71) Applicant: MOATECH CO., LTD., Incheon (KR)

(72) Inventor: In-yong Park, Incheon (KR)

(73) Assignee: MOATECH CO., LTD, Incheon (KR)

( * ) Notice: Subject to any disclaimer, the term of this patent is extended or adjusted under 35 U.S.C. 154(b) by 166 days.

(21) Appl. No.: 14/906,377

(22) PCT Filed: Jun. 19, 2014

(86) PCT No.: PCT/KR2014/005397
§ 371 (c)(1),
(2) Date: Jan. 20, 2016

(87) PCT Pub. No.: WO2015/016485
PCT Pub. Date: Feb. 5, 2015

(65) Prior Publication Data
US 2016/0164370 A1    Jun. 9, 2016

(30) Foreign Application Priority Data

Aug. 2, 2013  (KR) .......................... 10-2013-0092011

(51) Int. Cl.
| | |
|---|---|
| *H02K 7/06* | (2006.01) |
| *H02K 7/00* | (2006.01) |
| *H02K 1/27* | (2006.01) |
| *H02K 7/08* | (2006.01) |

(52) U.S. Cl.
CPC ............. *H02K 7/00* (2013.01); *H02K 1/2733* (2013.01); *H02K 7/06* (2013.01); *H02K 7/085* (2013.01)

(58) Field of Classification Search
CPC .................................. H02K 7/00; H02K 7/06
See application file for complete search history.

(56) References Cited

U.S. PATENT DOCUMENTS

| | | | | |
|---|---|---|---|---|
| 6,857,332 | B2 * | 2/2005 | Pfister ..................... | F16C 19/10 |
| | | | | 310/20 |
| 2008/0042525 | A1 * | 2/2008 | Shin ..................... | H02K 21/145 |
| | | | | 310/49.32 |
| 2011/0132115 | A1 * | 6/2011 | Lee ......................... | H02K 5/161 |
| | | | | 74/89.37 |

FOREIGN PATENT DOCUMENTS

| | | |
|---|---|---|
| JP | 2001-293577 A | 10/2001 |
| JP | 2011-00122724 A | 6/2011 |
| KR | 10-0544081 B1 | 1/2006 |
| KR | 10-2010-0106945 A | 10/2010 |
| KR | 10-1063341 B1 | 9/2011 |

\* cited by examiner

*Primary Examiner* — Dang Le
(74) *Attorney, Agent, or Firm* — John K. Park; Park Law Firm

(57) ABSTRACT

The invention relates generally to a step actuator, in which a lead screw coupled with a screw thread formed in a nut member is installed in a rotor magnet and moves back and forth in an axial direction responding to a rotation of the rotor to transmit power in an axial direction. A cylindrical bearing for rotatably supporting the nut member is disposed at an upper part of the nut member and integrally formed therewith, to fundamentally remove a gap in the axial direction in the coupled area between the cylindrical bearing and the nut member, thereby significantly reducing the feeding error of a rotator in the axial direction when the lead screw moves back and forth in the axial direction, and reducing the number of parts to be assembled to lower the material cost and the labor cost for assembly.

1 Claim, 3 Drawing Sheets

[Fig. 1]
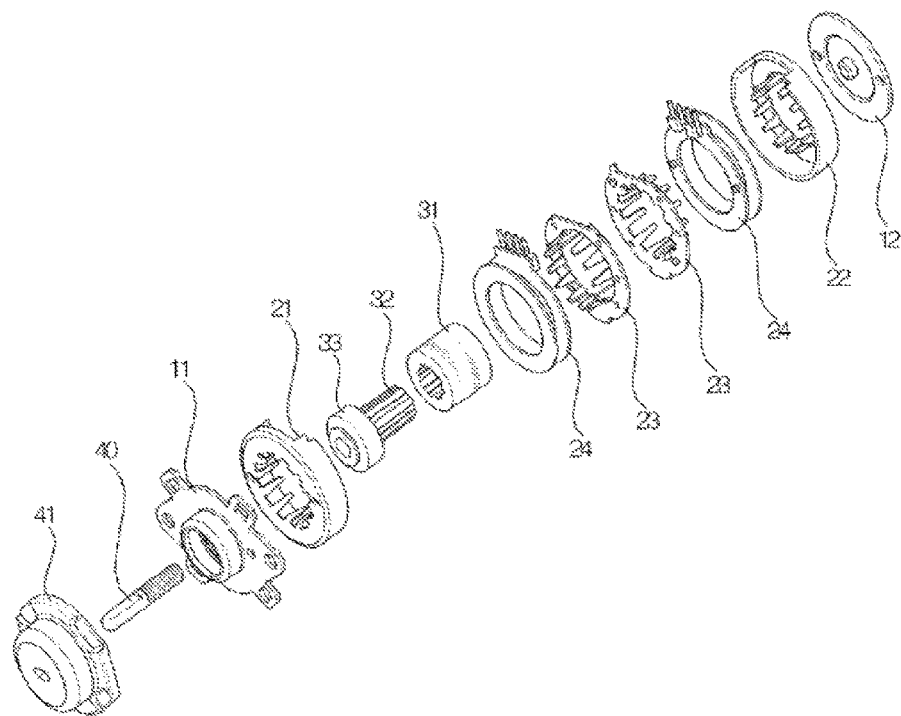
[Fig. 2]
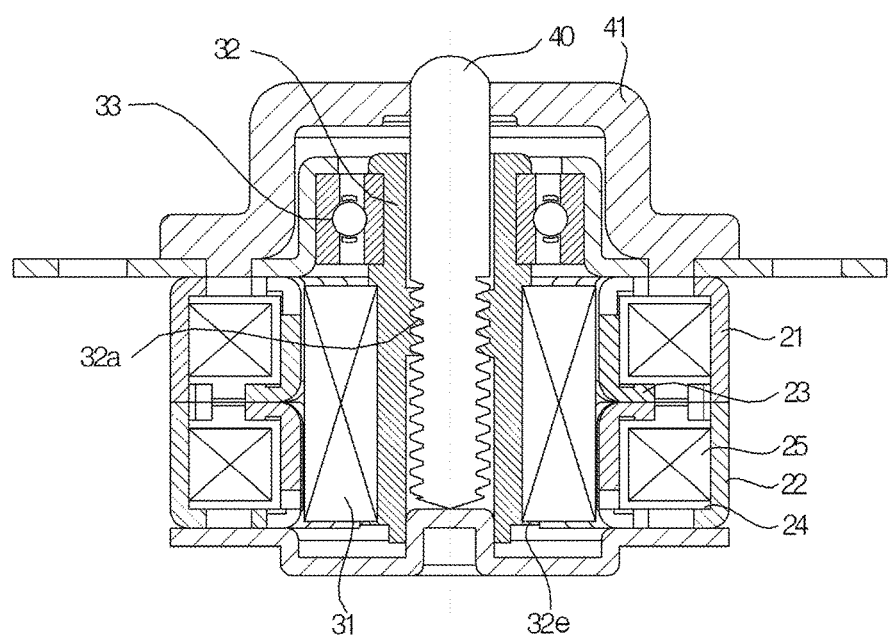

[Fig. 3]
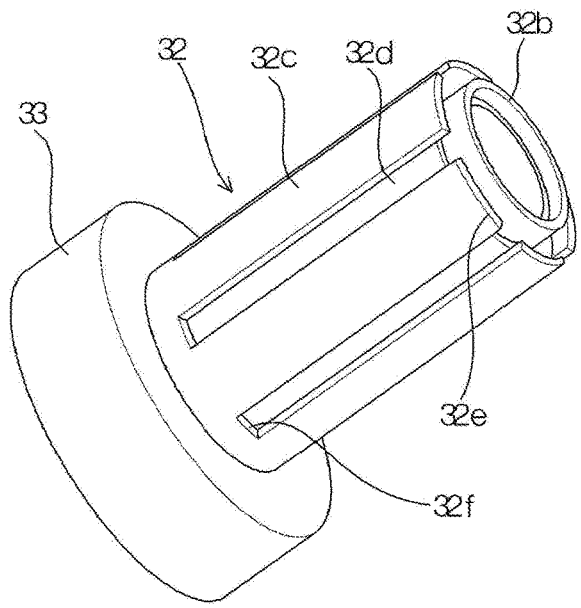
[Fig. 4]
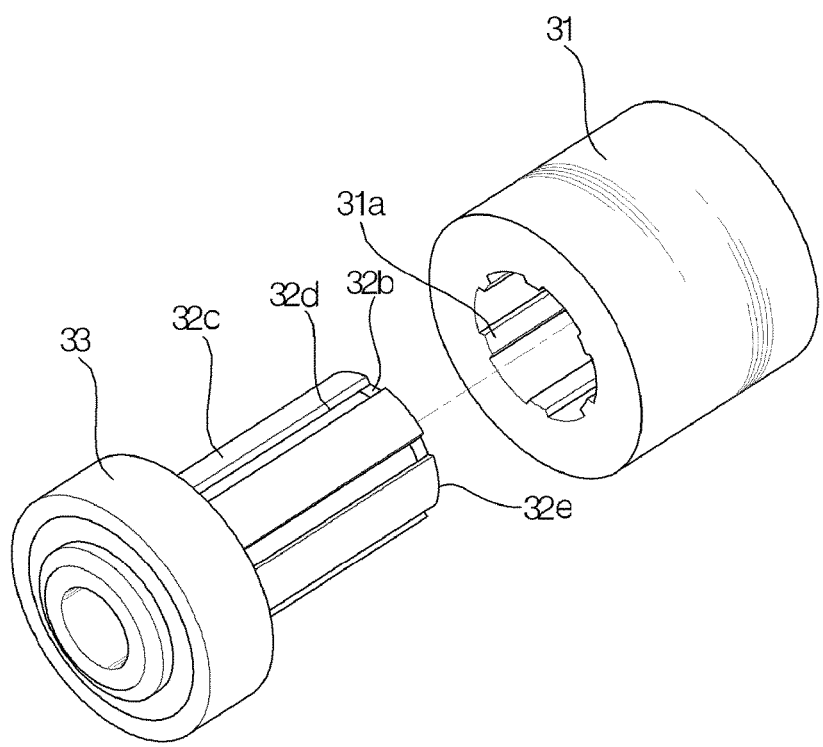

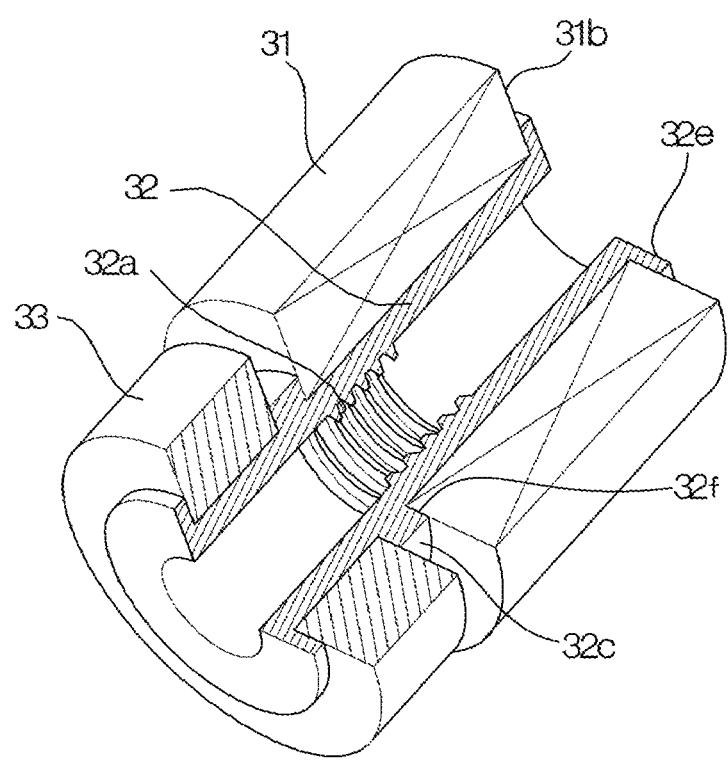
[Fig. 5]

STEP ACTUATOR

TECHNICAL FIELD

The present invention relates generally to a step actuator, in which a lead screw coupled with a screw thread formed in a nut member is installed in a rotor magnet and moves back and forth in an axial direction responding to a rotation of the rotor to transmit power in an axial direction. More specifically, the present invention relates to a step actuator in which a cylindrical bearing for rotatably supporting the nut member is disposed at an upper part of the nut member and integrally formed therewith, to fundamentally remove a gap in the axial direction in the coupled area between the cylindrical bearing and the nut member, thereby significantly reducing the feeding error of a rotator in the axial direction when the lead screw moves back and forth in the axial direction, and reducing the number of parts to be assembled to lower the material cost and the labor cost for assembly.

BACKGROUND ART

In general, a step actuator for applying the present invention includes: a stator having a bobbin for winding coil, and a yoke; a rotator having a cylindrical magnet disposed inside of the stator with a prescribed gap, and a hollow nut member with a screw thread of a prescribed length formed on inner circumference thereof, for being inserted and secured in the cylindrical magnet, whereby a lead screw coupled with the screw thread formed in the nut member moves back and forth in an axial direction responding to a rotation of the rotator to transmit power in the axial direction.

Such a step actuator conventionally includes a cylindrical bearing at the upper part of the nut member, for supporting the rotation of the nut member and maintaining the rotator and the stator coaxially surrounding the rotator. The cylindrical bearing is generally coupled to the upper part of a hollow shaft of the rotator. To prevent axial movement of the cylindrical bearing and the rotator, a stop ring engaging recess is formed to receive a stop ring at an area of the hollow shaft of the rotator projected over the upper surface of the cylindrical bearing, and a bearing support for supporting the cylindrical bearing is provided at an area of the hollow shaft of the rotator confronting a lower surface of the cylindrical bearing, thereby preventing the cylindrical bearing and the rotator from moving in an axial direction. In this structure, the distance allowance between the bearing support and the stop ring engaging recess may make an axial gap at the coupled area of cylindrical bearing and the nut member. As the result, feeding errors of the step actuator may become serious when the lead screw moves back and forth along the axial direction.

In an effort to solve the problems, a structure of coupling the nut member to the bearing through a swaging process after heating an end of the nut member or performing ultrasonic treatment on the end of the nut member was proposed by Korean Patent Application No. 10-2010-89709. Although this reduces the axial gap of the coupling area of the cylindrical bearing and the nut member to some extent, feeding errors still remain as the gap is not fully removed.

DISCLOSURE

Technical Problem

Accordingly, the present invention has been made keeping in mind the above problems occurring in the related art, and the present invention is intended to propose a step actuator in which a cylindrical bearing for rotatably supporting the nut member is disposed at the upper part of the nut member and is integrally formed therewith, to fundamentally remove gaps in the axial direction in the coupled area between the cylindrical bearing and the nut member, thereby significantly reducing the feeding error of the rotator in the axial direction when the lead screw moves back and forth in the axial direction, and reducing the number of parts to be assembled to lower the material cost and the labor cost for assembly.

Technical Solution

In order to achieve the above object, according to one aspect of the present invention, there is provided a step actuator including: a stator; a rotator having a magnet in which a hollow nut member is inserted and mounted therein, and rotating by an interaction with the stator; and a lead screw coupled to the screw thread formed on inner circumference of the hollow nut member, moving back and forth in response to a rotation of the rotator, wherein a cylindrical bearing for rotatably supporting the nut member is disposed at an upper part of the nut member and integrally formed therewith.

In the present invention, at least one groove may be formed on outer circumference of the nut member inserted into the magnet, and a protrusion may be formed on inner circumference of the magnet at a location corresponding to the groove, the protrusion engaging with the groove to prevent slip of the nut member inserted into the magnet when the magnet rotates.

In the present invention, the nut member may include a protruding part at a lower part thereof, which protrudes outside a lower surface of the magnet when the nut member is inserted into the magnet, and the protruding part may undergo a swaging process after heating the protruding part or performing ultrasonic treatment on the protruding part to be securely coupled with the magnet.

In the present invention, a lower part of the nut member may be securely coupled to the magnet by use of a stop ring.

In the present invention, the nut member and the cylindrical bearing may be integrally constructed by an insert injection molding process.

Advantageous Effects

In the step actuator according to the present invention, a lead screw coupled to a screw thread formed on inner circumference of a hollow nut member inserted into a magnet functioning as a rotator moves back and forth in an axial direction in response to a rotation of the rotator to transmit power in the axial direction, wherein a cylindrical bearing rotatably supporting the nut member is disposed at the upper part of the nut member and integrally formed therewith to fundamentally remove gaps in the axial direction in the coupled area between the cylindrical bearing and the nut member, thereby achieving significant reduction of the feeding error of the rotator in the axial direction when the lead screw moves back and forth in the axial direction, and reduction of the number of parts to be assembled to lower the material cost and the labor cost for assembly.

And the present invention secures the nut member and the magnet by engaging at least one groove formed on the outer circumference of the nut member with a protrusion formed on the inner circumference of the magnet at a location corresponding to the groove to achieve the prevention of slips of the nut member when the magnet rotates.

Moreover, the present invention provides a protruding part to the nut member, which protrudes outside the lower surface of the magnet when the nut member is inserted into the magnet, couples the protruding part of the nut member with the magnet through a swaging process after heating the protruding part or performing ultrasonic treatment on the protruding part to achieve a secure coupling of the nut member with the magnet.

DESCRIPTION OF DRAWINGS

FIG. 1 is an overall exploded view of a step actuator according to the present invention;

FIG. 2 is a cross-sectional view showing the assembled step actuator according to the present invention;

FIG. 3 is a perspective view of a nut member and a cylindrical bearing being integrally assembled;

FIG. 4 is an exploded view of the nut member before being inserted into a magnet according to an embodiment of the present invention; and FIG. 5 is a perspective view with partial internal section showing the nut member being inserted into the magnet, in which a protruding part is engaged and fixed to an end surface of the magnet through a swaging process according to an embodiment of the present invention.

<Description of the Reference Numerals in the Drawings>

| | |
|---|---|
| 11: a first cover. | 12: a second cover. |
| 21, 22: casing with integral yoke | 23: yoke |
| 24: bobbin | 25: coil |
| 31: magnet | 31a: protrusion |
| 32: nut member | 32a: screw thread |
| 32b: groove | 32c: protruding part |
| 33: cylindrical bearing | 40: lead screw |
| 41: lead screw guide | |

MODE FOR INVENTION

Reference will now be made in greater detail to an exemplary embodiment of the present invention, an example of which is illustrated in the accompanying drawings.

A step actuator according to the present invention includes: a stator including a bobbin 24 on which a coil 25 is wound, and a yoke 23 in a cavity formed by two casings 21 and 22 with respective integral yokes, for generating an electro-magnetic field by external electric signals; a rotor including a cylindrical magnet 32 installed in the stator and having a prescribed gap with the inner circumference of the stator, and a hollow nut member 32 for being inserted into and secured to the cylindrical magnet 31 and having a screw thread 32a of a prescribed length formed inner circumference thereof; and a lead screw 40 moving back and forth along an axial direction in response to a rotation of the rotator. And a cylindrical bearing 33 for rotatably supporting the nut member 32 is provided at an upper part of the nut member 32.

The step actuator further includes a first cover 11 provided on the upper part of a casing 21 with integral yoke and surrounding the cylindrical bearing 33 to prevent axial and radial movement of the cylindrical bearing 33; a lead screw guide 41 mounted on the upper part of the first cover 11, for supporting and guiding the lead screw 41 to move linearly; and a second casing 12 installed at the bottom of the casing 22 with integral yoke, for forming a protective cover for a lower part of the rotator and forming a protective cover for the actuator. A common PCB (Printed circuit Board) 51 is provided for applying external electric signals to the stator (not shown in FIGS. 1 and 2).

A cylindrical bearing 33 for rotatably supporting the nut member 32 is securely coupled to the upper part of the nut member 32, and the cylindrical bearing 33 and the nut member 32 are preferably constructed in an integral structure for fundamentally preventing the occurrence of gaps in the axial direction at the coupled area therebetween, as shown in FIG. 3.

More preferably, the nut member 32 and the cylindrical bearing 33 may be integrally formed by an insert injection molding process.

To prevent slip of the nut member 32 due to an incomplete securing of the nut member 32 being inserted into the magnet 31 when the magnet 31 rotates, at least one groove 32d is formed on outer circumference of the nut member 32, and a protrusion 31a is formed on inner circumference of the magnet 31 at a location corresponding to the groove 32d, and the protrusion 31a securely engages with the groove 32d. The groove 32d of the nut member 32 may be replaced by a protrusion, and the protrusion 31a may be accordingly replaced by a corresponding groove. The magnet 31 further comprises an end surface at an end thereof as shown in FIG. 5. The nut member 32 includes an inner cylinder 32b and an outer cylinder 32c as shown in FIGS. 3-5. A stopper 32f with a closed side is formed at a portion engaging with a bearing the groove 32d, so that when the nut member 32 is engaged with the magnet 31 the bearing 33 stays away from the magnet 31.

To enhance the coupling, a lower end of the nut member 32 may form a protruding part 32e that protrudes outside the lower surface of the magnet 31 when the nut member 32 is inserted into the inner circumference of the magnet 31, and the protruding part 32e undergoes a swaging process after heating the protruding part or performing ultrasonic treatment on the protruding part to be securely coupled with the magnet 31.

Alternately, the nut member 32 may be provided with a stop ring (not shown) at the lower end thereof for more securely coupling the nut member 32 to the magnet 31 when the nut member 32 is inserted into the inner circumference of the magnet 31.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A step actuator comprising: a stator; a rotor having a magnet in which a hollow nut member is inserted and mounted therein, and rotating by an interaction with the stator; and a lead screw coupled to the screw thread formed on inner circumference of the hollow nut member, moving back and forth in response to a rotation of the rotator, wherein a cylindrical bearing for rotatably supporting the nut member is integrally formed with the nut member by an insert injection molding process, wherein the nut member comprises an inner cylinder with screw threads formed on an inner circumference thereof and an outer cylinder enclosing an outer circumference of the inner cylinder, wherein the outer cylinder is installed with one or more grooves and the magnet is formed with a bump portion at a position corresponding to the groove, so as to have the nut member engaged and fixed to the magnet, wherein an end of the outer cylinder is formed with a protruding part that is exposed from an end surface of the magnet when the nut member is engaged with the magnet, so as to be fixed and engaged with the end surface of the magnet through a swaging process after applying heat or supersonic treatment to the protruding part, and wherein a stopper with a closed side is formed at a portion engaging with a bearing the groove, so that when the nut member is engaged with the magnet the bearing stays away from the magnet.

* * * * *